(12) United States Patent
Hara et al.

(10) Patent No.: US 11,821,835 B2
(45) Date of Patent: Nov. 21, 2023

(54) SPECTROSCOPIC ANALYSIS DEVICE AND OPERATION METHOD AND NON-TRANSITORY COMPUTER-READABLE MEDIUM (CRM) STORING PROGRAM FOR SPECTROSCOPIC ANALYSIS

(71) Applicant: YOKOGAWA ELECTRIC CORPORATION, Tokyo (JP)

(72) Inventors: Risa Hara, Tokyo (JP); Toshiyuki Saruya, Tokyo (JP); Kodai Murayama, Tokyo (JP); Fumie Watanabe, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 60 days.

(21) Appl. No.: 17/218,961

(22) Filed: Mar. 31, 2021

(65) Prior Publication Data
US 2021/0302306 A1 Sep. 30, 2021

(30) Foreign Application Priority Data
Mar. 31, 2020 (JP) ................. 2020-063469

(51) Int. Cl.
*G01N 21/31* (2006.01)
*G01N 21/25* (2006.01)

(52) U.S. Cl.
CPC ... *G01N 21/3103* (2013.01); *G01N 2021/258* (2013.01)

(58) Field of Classification Search
CPC ......... G01N 21/3103; G01N 2021/258; G01N 21/3554; G01N 21/553; G01N 21/31; G01N 21/59; G01N 2021/5903
See application file for complete search history.

(56) References Cited

U.S. PATENT DOCUMENTS 5,822,073 A * 10/1998 Yee ................. G01N 21/553
356/445
2001/0040130 A1* 11/2001 Lorch ............. G01N 33/54373
210/660

(Continued)

FOREIGN PATENT DOCUMENTS

| JP | 2008-209170 A | 9/2008 |
| JP | 2015-175780 A | 10/2015 |
| JP | 2018-4611 A | 1/2018 |

OTHER PUBLICATIONS

Akifumi Ikehata et al., "Quantitative Analyses of Absorption-Sensitive Surface Plasmon Resonance Near-Infrared Spectra"; Applied Spectroscopy, vol. 60, No. 7, pp. 747-751; Jul. 1, 2006 (5 pages).

(Continued)

*Primary Examiner* — Mohamed K Amara
(74) *Attorney, Agent, or Firm* — Osha Bergman Watanabe & Burton LLP

(57) ABSTRACT

A spectroscopic analysis device includes a detector and a processor. The detector detects measurement light obtained by irradiating, with irradiation light, a sample that contains a contained substance disposed on a film on which surface plasmons are generated. The measurement light includes information on an optical spectrum of the sample, and the information includes a resonance spectrum of the surface plasmons and an absorption spectrum of the sample. The processor calculates: a peak wavelength in a wavelength band in which the resonance spectrum and the absorption spectrum are generated; a peak absorbance of the contained substance based on an absorption band of the contained substance; and a ratio of the contained substance to the sample based on the peak wavelength and the peak absorbance.

6 Claims, 9 Drawing Sheets

(56) References Cited

U.S. PATENT DOCUMENTS

| | | | |
|---|---|---|---|
| 2002/0085204 A1* | 7/2002 | Elkind | G01N 21/553 356/445 |
| 2002/0115224 A1* | 8/2002 | Rudel | B01J 19/0046 436/164 |
| 2003/0003018 A1* | 1/2003 | Stolowitz | B82Y 30/00 422/82.11 |
| 2004/0009516 A1* | 1/2004 | Nelson | B82Y 30/00 435/7.1 |
| 2004/0046963 A1* | 3/2004 | Lackritz | G01N 21/553 356/445 |
| 2005/0117157 A1* | 6/2005 | Tarsa | G01N 21/39 356/437 |
| 2005/0159657 A1* | 7/2005 | Cappo | G01N 21/553 600/315 |
| 2005/0213101 A1* | 9/2005 | Schermer | B01L 3/5085 356/445 |
| 2005/0219542 A1* | 10/2005 | Adams | G01N 21/553 356/445 |
| 2006/0127278 A1* | 6/2006 | Gast | G01N 21/648 422/82.05 |
| 2006/0146332 A1* | 7/2006 | Lin | G01N 21/553 356/445 |
| 2006/0158653 A1* | 7/2006 | Chiarello | G01N 21/553 356/445 |
| 2006/0170925 A1* | 8/2006 | Lin | G01N 21/553 356/445 |
| 2007/0109541 A1* | 5/2007 | Imato | G01N 21/553 356/445 |
| 2008/0099667 A1* | 5/2008 | Stark | G01N 21/648 250/227.18 |
| 2009/0268205 A1* | 10/2009 | Naya | G01N 21/553 356/445 |
| 2011/0188043 A1* | 8/2011 | Davidov | G01N 21/553 356/445 |
| 2012/0232225 A1* | 9/2012 | Baker, Jr. | C08G 83/004 525/418 |
| 2013/0168543 A1* | 7/2013 | Barron | G01N 30/74 250/259 |
| 2014/0186215 A1* | 7/2014 | Shinta | G01N 21/658 977/773 |
| 2015/0009503 A1* | 1/2015 | Shimoyama | G01N 33/0036 356/445 |
| 2016/0238526 A1* | 8/2016 | Fadaei | G01N 33/2823 |
| 2018/0321150 A1* | 11/2018 | Gavaris | A61B 5/1455 |
| 2021/0404875 A1* | 12/2021 | Schwab | G01N 21/6408 |

OTHER PUBLICATIONS

Akifumi Ikehata et al., "Surface Plasmon Resonance Near-Infrared Spectroscopy", American Chemical Society; Analytical Chemistry, vol. 76, No. 21, pp. 6461-6469; Nov. 1, 2004 (9 pages).

* cited by examiner

SPECTROSCOPIC ANALYSIS DEVICE AND OPERATION METHOD AND NON-TRANSITORY COMPUTER-READABLE MEDIUM (CRM) STORING PROGRAM FOR SPECTROSCOPIC ANALYSIS

BACKGROUND

Technical Field

The present invention generally relates to a spectroscopic analysis device and an operation method and a non-transitory computer-readable medium (CRM) storing a program for spectroscopic analysis.

Related Art

Art for analyzing a state of a sample of a solution or the like is conventionally known. For example, patent document 1 discloses art for measuring a moisture content in a sample using Karl Fischer reagent. Furthermore, patent document 2 discloses art for measuring concentration, refractive index, and the like of a sample using reduction of surface plasmons when light is made incident on an inner surface of a metal layer in contact with the sample. Also, patent document 3 discloses art for measuring a moisture percentage of a sample by forming an optical load film by adding the sample dropwise onto a water absorption measurement chip and measuring absorbance.

PATENT DOCUMENTS

Patent Document 1: JP 2018-4611 A
Patent Document 2: JP 2015-175780 A
Patent Document 3: JP 2008-209170 A There is room for improvement in precision of measuring moisture percentages of samples in conventional art. Furthermore, there is room for improvement of measurement efficiency in conventional art.

SUMMARY

One or more embodiments provide a spectroscopic analysis device for enabling improvement of measurement precision and efficiency of a state of a sample.

A spectroscopic analysis device according to one or more embodiments includes: a detector for detecting measurement light obtained by irradiating a sample disposed on a film on which surface plasmons are generated with irradiation light, the measurement light including information on an optical spectrum including a resonance spectrum of the surface plasmons and an absorption spectrum of the sample; and a processing unit for deriving, in the optical spectrum, a peak wavelength in a wavelength band in which the resonance spectrum and the absorption spectrum are generated and an absorbance at a predetermined wavelength and deriving a ratio of a contained substance in the sample from the peak wavelength and the absorbance. Using the absorbance of the contained substance in addition to the refractive index of the sample enables improvement of measurement precision and efficiency of the state of the sample.

In the spectroscopic analysis device according to one or more embodiments, the processing unit corrects the optical spectrum using a baseline of the optical spectrum in a state wherein the sample does not contain the contained substance and derives the absorbance. Performing baseline correction processing on the optical spectrum improves the precision of calculating the absorbance of the contained substance.

In the spectroscopic analysis device according to one or more embodiments, the processing unit outputs predetermined information when the ratio calculated from either the peak wavelength or the absorbance does not match the ratio calculated from the other. In measurement where the state of the sample may fluctuate, the spectroscopic analysis device can output predetermined information such that an operator can detect the fluctuation in the state of the sample at an early stage.

The spectroscopic analysis device operation method according to one or more embodiments includes: a step for detecting measurement light obtained by irradiating a sample disposed on a film on which surface plasmons are generated with irradiation light, the measurement light including information on an optical spectrum including a resonance spectrum of the surface plasmons and an absorption spectrum of the sample; and a step for deriving, in the optical spectrum, a peak wavelength in a wavelength band in which the resonance spectrum and the absorption spectrum are generated and an absorbance at a predetermined wavelength and deriving a ratio of a contained substance in the sample from the peak wavelength and the absorbance. Using the absorbance of the contained substance in addition to the refractive index of the sample enables improvement of measurement precision and efficiency of the state of the sample.

According to one or more embodiments, it is possible to improve measurement precision and efficiency of a state of a sample.

DETAILED DESCRIPTION

Figure 1:
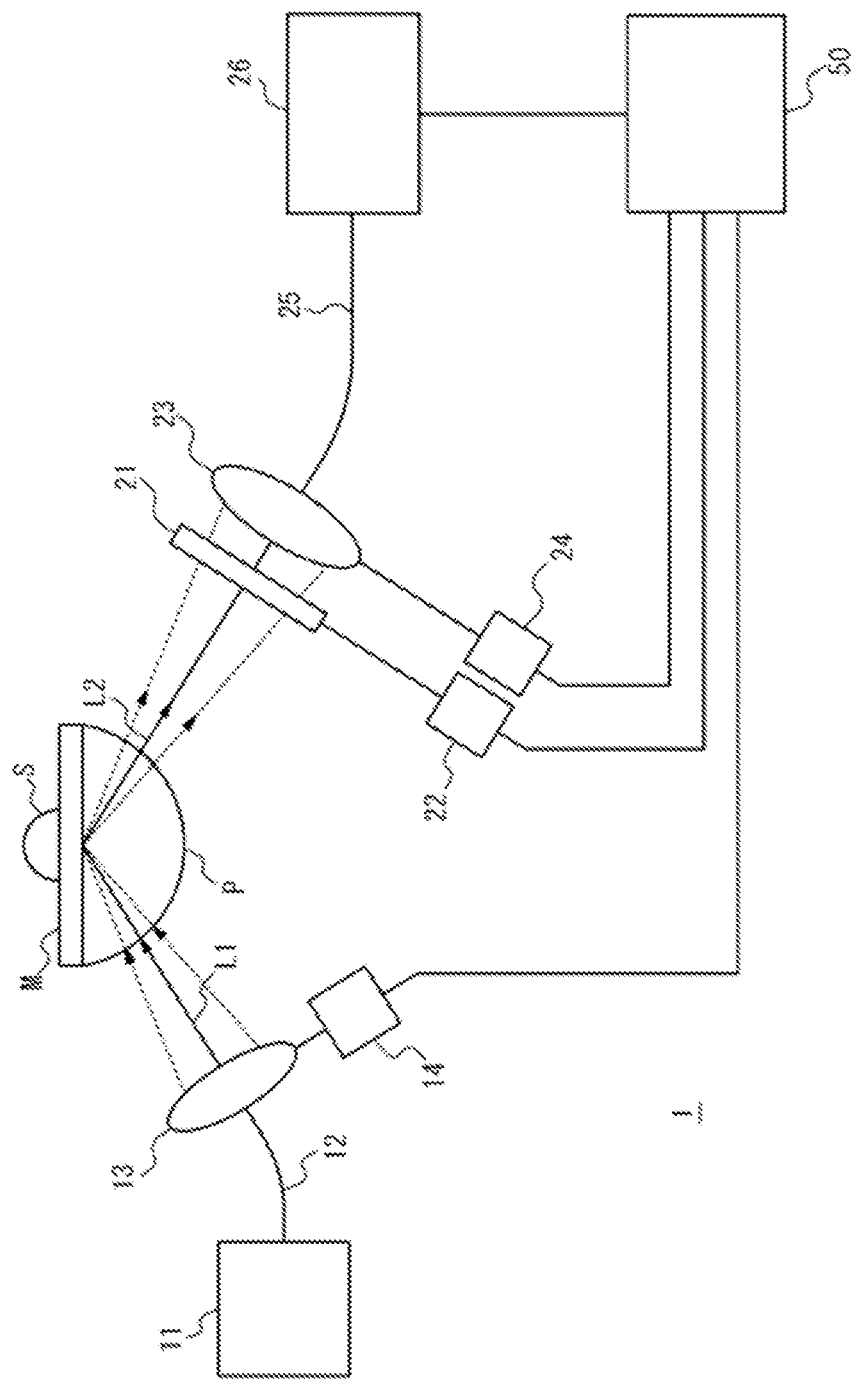
FIG. 1 is a schematic diagram illustrating an outline configuration of a spectroscopic analysis device.

Karl Fischer moisture measurement is given as one example of art relating to one or more embodiments. Karl Fischer moisture measurement is used to measure the moisture content in a sample. Karl Fischer moisture measurement includes a volumetric titration method in which Karl Fischer reagent is used for titration and a coulometric titration method in which a reagent is generated by electrolysis to titrate moisture. The volumetric titration method is a method for adding a sample to a titration solvent (dehydration solvent) for extracting the moisture of a sample contained in a reaction vessel and titrating using Karl Fischer reagent, which is mainly composed of iodine, sulfur dioxide, and a base, to detect an end point using a detection electrode immersed in the titration solvent. Then, the moisture content in the sample is found based on the volume of Karl Fischer reagent required for titration. Meanwhile, the coulometric titration method is a method for using an anolyte in which iodine in the Karl Fisher's reagent is replaced with iodide ions, housing the anolyte and catholyte in a reaction vessel, and electrolytically oxidizing the sample on an anolyte side where a detection electrode is disposed. Karl Fischer reagent is generated from an anolyte by iodine generated by electrolytic oxidation and reacts with the moisture in the sample to consume the moisture in the sample. Then, the moisture content in the sample is found based on the amount of electricity required for electrolysis.

However, according to the foregoing Karl Fischer moisture measurement, the sample must be sampled to mix the sample with the Karl Fischer reagent or the dehydrating solvent at the time of measurement, and thus a portion of the sampled sample must be discarded. Furthermore, when measuring the sample in an in-line state in an industrial process, the state of the sample may change over time between sampling and analysis of the sample, and thus it is difficult to measure the state of the sample in real time. Thus, there is room for improvement in measurement efficiency in Karl Fischer moisture measurement.

Moreover, a surface plasmon resonance (SPR) sensor is given as another example of art relating to one or more embodiments. The SPR sensor is used to measure the concentration of a sample or the moisture percentage of a sample by utilizing the surface plasmon resonance phenomenon. In the SPR sensor, a sensor film for specifically binding to the sample added dropwise is provided on a surface of a metal layer in which surface plasmon resonance occurs due to light from a light source, and the intensity of light emitted from the sensor film is detected by an optical sensor. A wavelength forming a peak in the optical spectrum of the emitted light (hereinafter, absorption peak wavelength or simply peak wavelength) is determined, and change in the absorption peak wavelength is observed in accordance with the refractive index of the sample. The refractive index of the sample is correlated to the concentration of the sample, and thus, utilizing this, the concentration of the sample can be found from the amount of change in the absorption peak wavelength.

However, when measuring the moisture percentage of the sample using a SPR sensor such as the foregoing, and since the change in the absorption peak wavelength is caused by the change in the refractive index of the sample, the refractive index may change when a solvent other than water or a foreign substance is mixed in the sample, or due to the temperature of the sample also being affected, and thus it is not possible to distinguish whether the amount of change in the absorption peak wavelength is caused only by moisture or by factors other than moisture. Therefore, there is room for improvement in measurement precision of moisture percentage.

Additionally, measurement of the moisture content in a sample using a light absorption measurement chip is given as another example of art relating to one or more embodiments. The light absorption measurement chip in one example has an optical load film composed of a substance that selectively reacts with water to change the absorption spectrum of light (for example, a porous membrane having a Co complex loaded thereon) provided on a transparent substrate having an internal portion configured as a waveguide for light. When a sample is added dropwise to this optical load film, the optical load film onto which the sample is added dropwise selectively reacts with the moisture therein to change the absorption spectrum of evanescent light when evanescent light leaks onto the optical load film via total reflection in the transparent substrate. Therefore, by measuring the absorbance of the optical load film using evanescent light of the measurement light propagated by total reflection in the transparent substrate, it is possible to find the light transmittance of the sample and measure the moisture content in the sample according to the light transmittance.

However, the foregoing light absorption measurement chip cannot be used for in-line measurement or continuous measurement with the same chip because it causes an irreversible change due to adsorption of water molecules. Therefore, there is room for improvement in measurement efficiency.

One or more embodiments enable measurement of the state of a sample at higher precision and higher efficiency than the conventional art described above.

Embodiments of the present invention will be described herein with reference to the drawings. Those skilled in the art will recognize that many alternative embodiments can be accomplished using the teaching of the present invention and that the present invention is not limited to the embodiments illustrated herein for explanatory purposes.

FIG. 1 is a diagram illustrating a configuration of a spectroscopic analysis device 1 in one or more embodiments. The spectroscopic analysis device 1 analyzes the state of a sample S disposed on a metal thin film M in which surface plasmons are generated. The sample S includes, for example, carious solutions and liquefied gasses. For example, the spectroscopic analysis device 1 may measure a ratio of a contained substance in the sample S as analysis of the state of the sample S. The contained substance is, for example, water, and the ratio is the moisture percentage. In one or more embodiments, as analysis of the state of the sample S, the spectroscopic analysis device 1 may measure a component composition, including the type and ratio of components in sample S, and any other physical or chemical parameter capable of being understood from the absorption spectrum of the sample S. In one or more embodiments, the ratio of the contained substance indicates a ratio of the substance contained in the sample to the sample.

The spectroscopic analysis device 1 has a single broadband light source 11 for irradiating an irradiation light L1 having a wavelength band including a visible region and a near infrared region, a light guide component 12 for guiding the irradiation light L1 irradiated from the broadband light source 11, and an optical parallelizing component 13 for adjusting the irradiation light L1 emitted from the light guide component 12 to parallel light. The irradiation light L1 emitted from the light parallelizing component 13 becomes incident on a prism substrate P to which the metal thin film M is bonded. The metal thin film M includes, for example, a thin film such as gold, silver, or copper. Alternatively, instead of the metal thin film M, any film on which surface plasmons are generated may be bonded to the prism substrate P. The prism substrate P includes, for example, a cylindrical prism or a hemispherical prism. The sample S is disposed on the metal thin film M. The spectroscopic analysis device 1 has a rotation mechanism 14 having the interface between the metal thin film M and the prism substrate P as the axial center thereof. The rotation mechanism 14 is installed on, for example, the optical parallelizing component 13 and adjusts the angle of incidence of the irradiation light L1 with respect to the metal thin film M.

The spectroscopic analysis device 1 has a polarizer 21 provided with a rotation mechanism 22 for controlling a polarization of a measurement light L2 reflected by the prism substrate P and a condensing component 23 for condensing the measurement light L2 emitted from the polarizer 21. The spectroscopic analysis device 1 has a rotation mechanism 24 having the interface between the metal thin film M and the prism substrate P as the axial center thereof. The rotation mechanism 24 is installed on, for example, the condensing component 23 and adjusts the light receiving angle of the measurement light L2. The spectroscopic analysis device 1 has a light guide component 25 for guiding the measurement light L2 condensed by the condensing component 23 and a spectroscopic unit 26 for detecting the measurement light L2 propagating through the light guide component 25.

The spectroscopic analysis device 1 has a processing unit 50 for acquiring optical spectrum information based on the detected measurement light L2. The optical spectrum includes, for example, the resonance spectrum of the surface plasmons in the metal thin film M and the absorption spectrum of the sample S. The optical spectrum information includes profile information of the entire optical spectrum acquired over a predetermined wavelength range, but it is not limited thereto and may include, for example, information on the light intensity of the measurement light L2, which is obtained by converting profile information of the optical spectrum along the wavelength axis by an optical filter that transmits only a portion of a fixed wavelength region.

Figure 2:
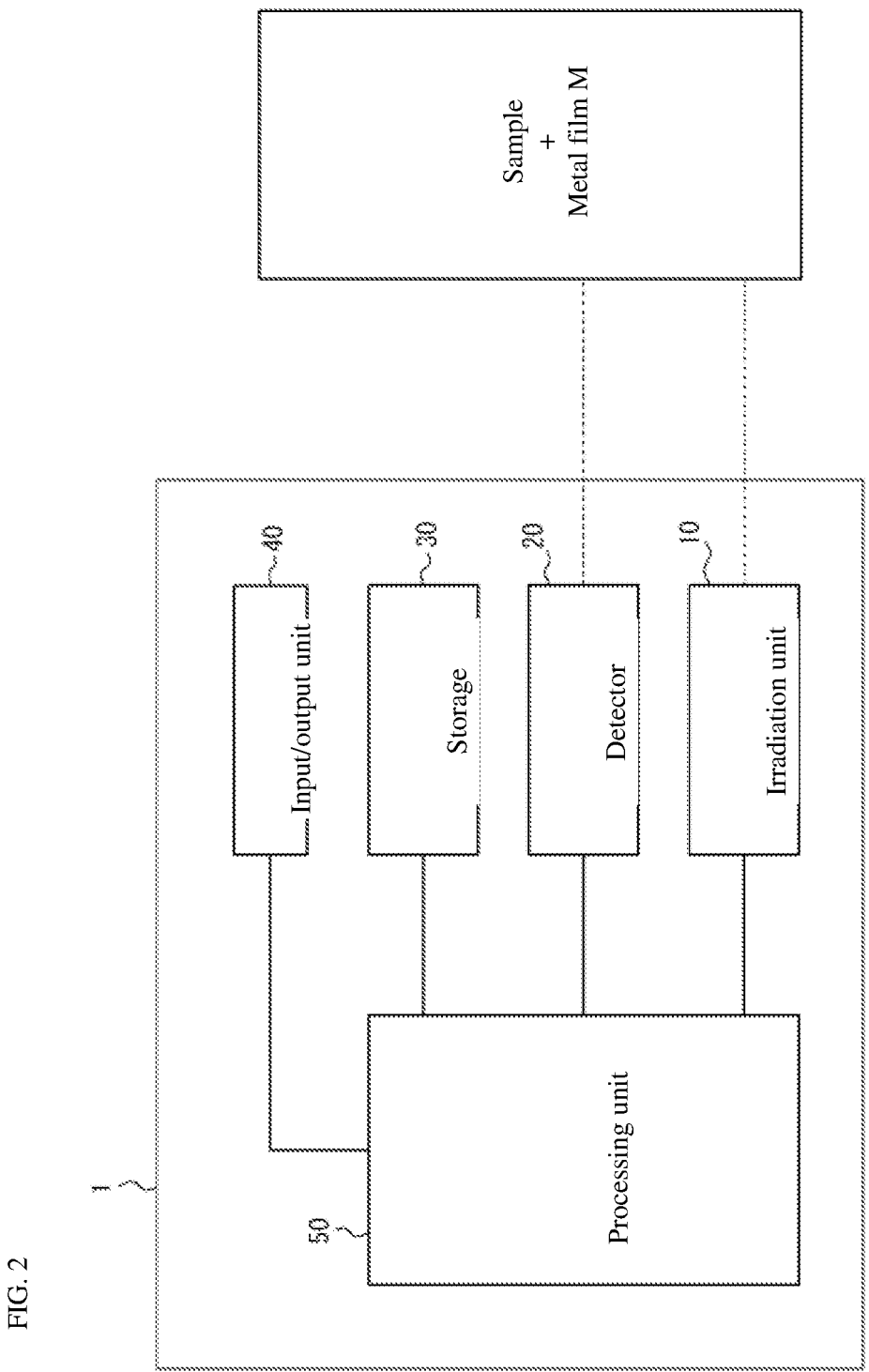
FIG. 2 is a block diagram corresponding to a configuration of a spectroscopic analysis device.

FIG. 2 is a block diagram corresponding to a configuration of the spectroscopic analysis device 1. The configuration of the spectroscopic analysis device 1 will be described in further detail with reference to FIG. 1 and FIG. 2.

In addition to the processing unit 50 described above, the spectroscopic analysis device 1 has an irradiation unit 10, a detector 20, a storage 30, and an input/output unit 40.

The irradiation unit 10 includes any optical system for irradiating the metal thin film M with the irradiation light L1. For example, the irradiation unit 10 includes the broadband light source 11, light guide component 12, optical parallelizing component 13, and rotation mechanism 14 described above.

The broadband light source 11 includes, for example, a single light source for irradiating the irradiation light L1 having a wavelength band including a visible region and a near infrared region. The light guide component 12 may include, for example, an optical fiber, or may include spatial optical components such as a lens or a mirror. The optical parallelizing component 13 includes, for example, spatial optical components such as a lens or a mirror. The rotation mechanism 14 includes any mechanism capable of rotating the optical parallelizing component 13 about the interface between the metal thin film M and the prism substrate P to adjust the angle of incidence of the irradiation light L1 with respect to the metal thin film M.

The detector 20 includes any optical system for detecting the measurement light L2 including the optical spectrum information, the measurement light L2 being based on the irradiation light L1 irradiated by the irradiation unit 10. For example, the detector 20 includes the polarizer 21, rotation mechanisms 22 and 24, condensing component 23, light guide component 25, and spectroscopic unit 26 described above.

The rotation mechanism 22 includes any mechanism capable of rotating the polarizer 21 to control polarization of the measurement light L2 reflected in the prism substrate P. The condensing component 23 includes, for example, spatial optical components such as a lens or a mirror. The rotation mechanism 24 includes any mechanism capable of rotating the optical condensing component 23 about the interface between the metal thin film M and the prism substrate P to adjust the light receiving angle of the measurement light L2. The light guide component 25 may include, for example, an optical fiber, or may include spatial optical components such as a lens or a mirror. The spectroscopic unit 26 includes, for example, a spectroscope having a near-infrared region spectroscopic element and a near-infrared region detection element.

The storage 30 includes any storage module including a hard disk drive (HDD), a solid state drive (SSD), an electrically erasable programmable read-only memory (EEPROM), a read-only memory (ROM), and a random access memory (RAM). The storage 30 may function as, for example, a main storage device, an auxiliary storage device, or a cache memory. The storage 30 stores any information used in operation of the spectroscopic analysis device 1. For example, the storage 30 may store information on the optical spectrum detected by the detector 20. For example, the storage 30 may store a system program, an application program, or the like. The storage 30 is not limited to being built into the spectroscopic analysis device 1 and may be an external storage module connected by a digital input/output port such as USB (universal serial bus).

The input/output unit 40 has an input interface for detecting user input and sending input information to the processing unit 50. Said input interface is, for example, any input interface including a physical key, a capacitance key, a touch screen integrally provided together with a panel display, various pointing devices, or the like. Furthermore, the input/output unit 40 has an output interface for outputting information generated by the processing unit 50 or read from the storage 30 to the user. Said output interface is, for example, any output interface such as a display for outputting information as an image/video.

The processing unit 50 includes one or more processors. The processor is a general-purpose processor or a dedicated processor specialized for specific processing, but it is not limited thereto. The processing unit 50 is connected to each component constituting the spectroscopic analysis device 1 such that communication is possible and controls operation of the entire spectroscopic analysis device 1.

In the spectroscopic analysis device 1, the irradiation light L1 irradiated from the broadband light source 11 becomes incident on the prism substrate P to which the metal thin film M is bonded via the light guide component 12 and the light parallelizing component 13. The measurement light L2 totally reflected and emitted at the interface of the prism substrate P passes through the polarizer 21 adjusted to exclude polarized light in the horizontal direction with respect to the interface of the prism substrate P or polarized light in the direction perpendicular to the interface of the prism substrate P and is condensed by the condensing component 23. The measurement light L2 condensed by the condensing component 23 is detected by the spectroscopic unit 26.

The processing unit 50 acquires the information of the optical spectrum based on the detection information outputted from the spectroscopic unit 26. The optical spectrum includes, for example, the resonance spectrum of the surface plasmons in the metal thin film M and the spectrum in the wavelength band in which the absorption spectrum of the sample S occurs. Said wavelength band is included in, for example, the near infrared region, and includes, for example, the wavelength region of light of 900 nm or more and less than 2000 nm.

Figure 3:
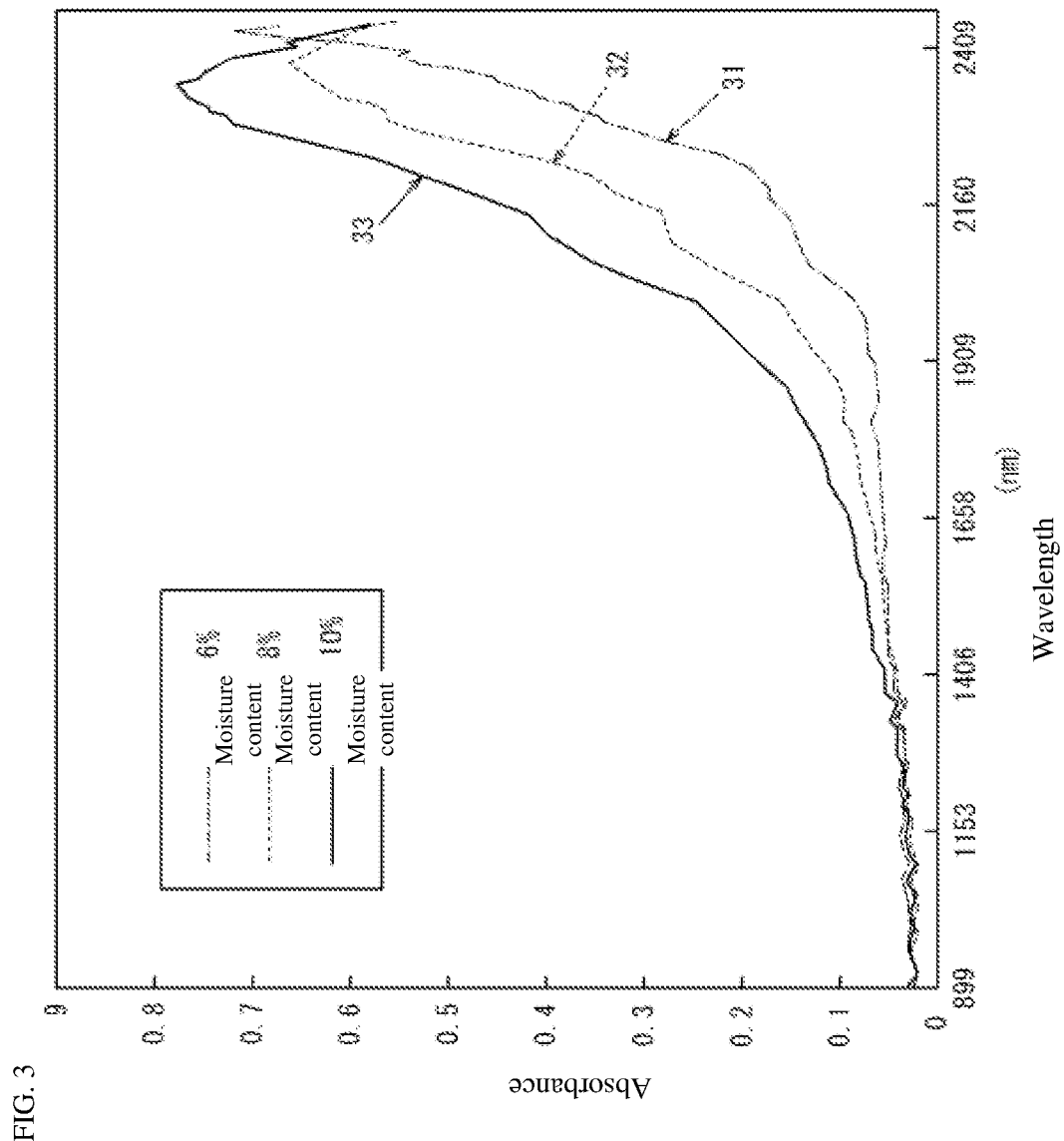
FIG. 3 is a diagram illustrating an example of an optical spectrum.

FIG. 3 illustrates an example of an optical spectrum processed by the processing unit 50. FIG. 3 illustrates a spectrum wherein the horizontal axis is the wavelength of the measurement light L2, the vertical axis is the absorbance, and an organic solvent having a different water content is sample S. For example, it illustrates absorption spectra 31, 32, and 33 obtained from the samples S having moisture contents of 6%, 8%, and 10%, respectively. The absorption spectra 31, 32, and 33 include an absorption band where peaks are formed near 2400 to 2300 nm due to enhanced absorption owing to plasmon resonance, an absorption band of organic solvents with peaks at 2420 nm, 2350 nm, and 2310 nm, respectively, due to absorption of the molecules of sample S, and a water absorption band having a peak at 1950 nm.

Here, as the absorption band in which absorption is enhanced by plasmon resonance differs according to the refractive indices of the sample S and the prism substrate P, the peak wavelength differs according to the refractive index of the sample S, and the refractive index of the sample S differs according to the contained moisture content, and thus the peak wavelength differs according to the moisture percentage of the sample S. Therefore, the moisture percentage of the sample S is found by identifying the peak wavelength. Meanwhile, when focusing on the absorption band in which the peak caused by water is formed, the absorbance changes according to the moisture percentage in the sample S. That is, the absorbance increases the higher the moisture percentage is. Utilizing this, the processing unit 50 in the present embodiment finds the moisture percentage of the sample S from the peak wavelength in the absorption band wherein enhancement by plasmon resonance occurs and the absorbance in the water absorption band.

Figure 4:
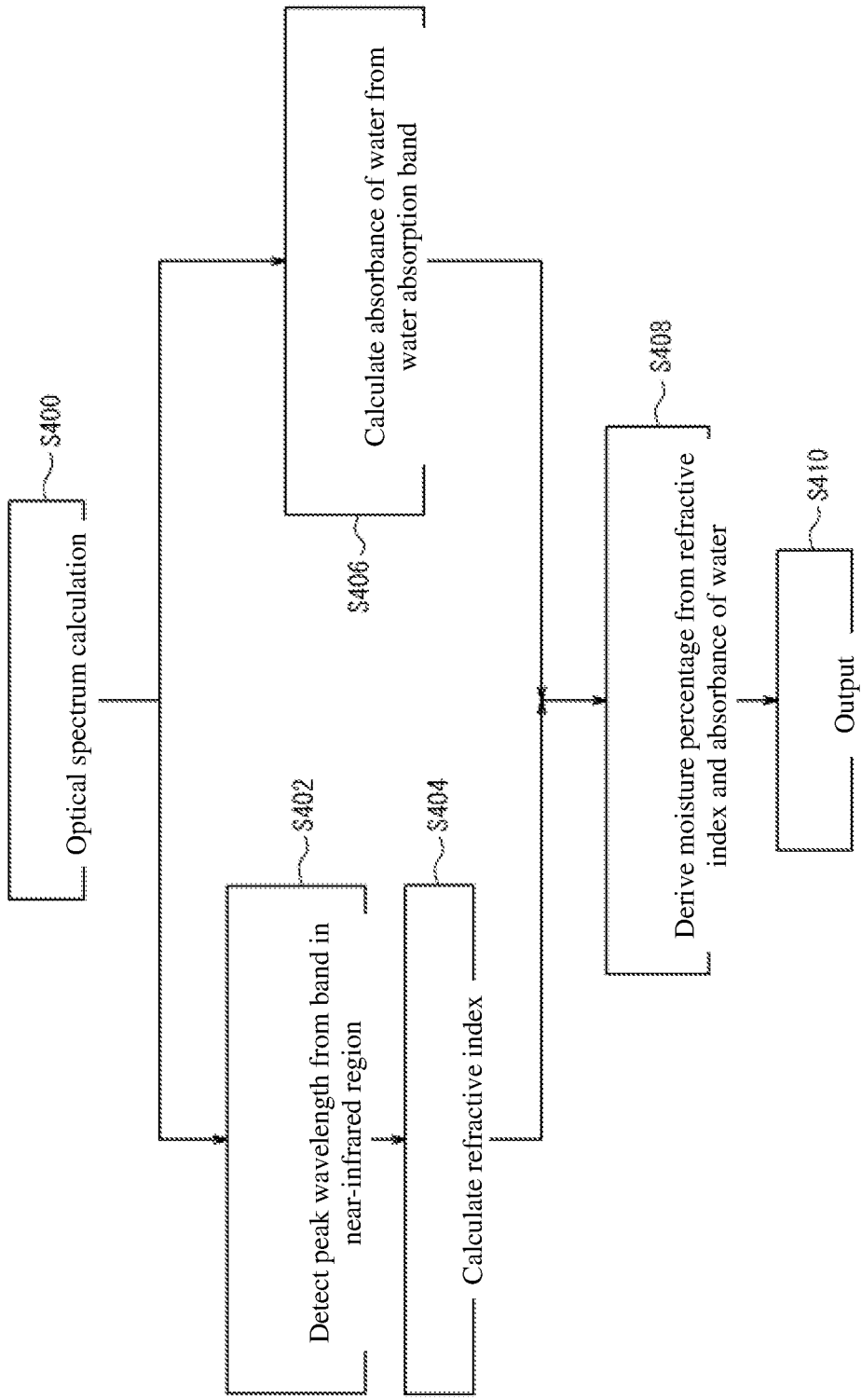
FIG. 4 is a flowchart for describing one example of operation of a spectroscopic analysis device.

FIG. 4 is a flowchart for describing a procedure of processing operation by the processing unit 50.

In a step S400, the processing unit 50 calculates the optical spectrum that includes the resonance spectrum of the surface plasmons and the absorption spectrum of the sample S from the measurement light L2.

In a step S402, the processing unit 50 calculates, within the optical spectrum included in the measurement light L2 as information, the peak wavelength corresponding to the peak of the absorbance in the wavelength band (900 nm to 2500 nm) in the near infrared region.

In a step S404, the processing unit 50 derives the refractive index of the sample S corresponding to the peak wavelength. For example, the peak wavelength and the refractive index of the sample S associated in advance based on experimental results and the like are stored in the storage 30, and the processing unit 50 reads the refractive index corresponding to the peak wavelength from the storage 30.

In a step S406, the processing unit 50 calculates the absorbance of the peak caused by water from the water absorption band (near 2000 nm; for example, a band from 1900 nm to 2050 nm). The water peak is located on a non-linear baseline in the optical spectrum, and thus the processing unit 50 calculates the absorbance of the water peak by performing baseline correction processing on the water absorption band in the optical spectrum. Since the absorbance of the water fluctuates as the peak wavelength fluctuates according to the refractive index of the sample S, when correction processing is performed on the optical spectrum using a baseline having a peak wavelength different from the optical spectrum, an accurate absorbance of the water cannot be obtained, and the moisture percentage cannot be calculated accurately. In other words, when correction processing is performed on a plurality of optical spectra having different peak wavelengths using the same baseline, the precision of calculating the moisture percentage using the absorbance of the water decreases. Thus, when calculating the moisture percentage using the absorbance of the water by performing baseline correction, by rotating the light parallelizing component 13, the peak wavelength of the optical spectrum is forcibly made to fluctuate, so to speak, and by matching the peak wavelength of the detected optical spectrum to the peak wavelength of the known baseline, the precision of calculating the moisture percentage from the absorbance of the water by baseline correction is improved. For example, known baseline information for each type of sample S is stored in the storage 30 in advance. Before the start of measurement, for example, the operator performs an input for designating the type of the sample via the input/output unit 40, and the processing unit 50 reads the baseline information corresponding to the designated type from the storage 30 and performs baseline correction processing on the water absorption band to calculate the absorbance of the water. In the optical spectrum overall, the change in the absorbance of the water with respect to the change in the moisture percentage is small, but by performing the baseline correction processing on the water absorption band, the precision of calculating the absorbance of water improves.

In a step S408, the processing unit 50 derives the moisture percentage in the sample S from the refractive index of the sample S and the absorbance of the water. For example, a combination of the refractive index of the sample S and the absorbance of the water, which are associated with each other based on experimental results and the like, and the moisture percentage of the sample S are stored in the storage 30 in advance, and the moisture percentage corresponding to the combination of the refractive index of the sample S and the absorbance of the water is read. Alternatively, a moisture percentage corresponding to the refractive index and a moisture percentage corresponding to the absorbance of the water, which are found in advance by experiments or the like, are each stored in the storage 30 for each type of sample S. The processing unit 50 reads the moisture percentage corresponding to the refractive index and the moisture percentage corresponding to the absorbance of the water from the storage 30 and compares the two. Then, on the condition that the two match within an arbitrary margin of error (for example, ±5%), the processing unit 50 may adopt the matching moisture percentage (for example, the average of both) as the moisture percentage calculated from the refractive index of the sample S and the absorbance of the water. Note, the present embodiment can also be applied to the measurement of the moisture percentage of a sample other than an organic solvent.

In a step S410, the processing unit 50 outputs the moisture percentage of the sample S. For example, the processing unit 50 displays the moisture percentage on a display of the input/output unit 40 to output it to the user.

According to the present embodiment, not only can the moisture percentage of the sample S be indirectly calculated via the refractive index of the sample S identified based on the peak wavelength of the optical spectrum, but the moisture percentage can also be identified using the absorbance of the water. Therefore, for example, according to the present embodiment, it is possible to improve the precision of measuring the moisture percentage compared to a general SPR sensor. Furthermore, since additional equipment for measuring moisture content is required when attempting to ensure measurement precision using a general SPR sensor, according to the spectroscopic analysis device 1 of the present embodiment, it is possible to improve the measurement precision by a simple configuration.

Moreover, the present embodiment does not require sample sampling, and thus, for example, when compared to Karl Fischer moisture measurement, waste due to disposal of samples can be eliminated, and the influence of changes in state of the sample due to the time difference from sampling to measurement can be eliminated. There is also no difficulty in continuous measurement as when using a light absorption measurement chip that causes an irreversible change due to adsorption of water molecules. Therefore, according to the present embodiment, real-time, continuous measurement is possible, and thus in-line measurement in industrial processes is also possible, and measurement efficiency can be improved.

<Variation 1>

Figure 5:
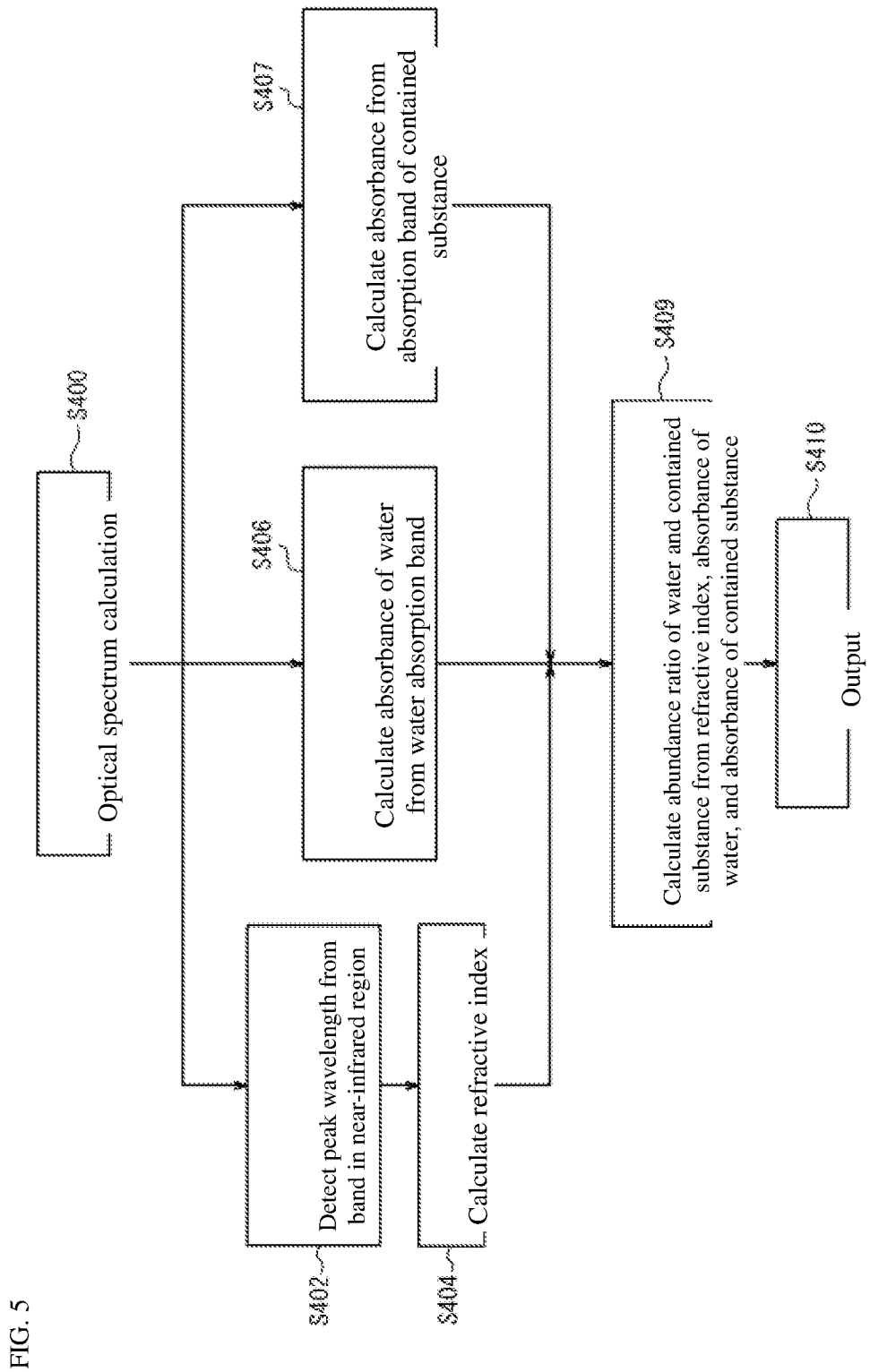
FIG. 5 is a flowchart for describing one example of operation of a spectroscopic analysis device.

FIG. 5 is a flowchart for describing a procedure of processing operation by the processing unit 50 in a variation. This modification is an example of measuring the abundance ratio of water contained in the sample and a contained substance other than water using the spectroscopic analysis device 1. In one or more embodiments, in the sample containing water and the substance other than water, the abundance ratio indicates a ratio of water to the substance other than water. This differs from the procedure in FIG. 4 in that a step S407 is added to the procedure of FIG. 4 and step S408 is replaced by a step S409, but all other steps are the same as those in FIG. 4. Steps differing from those in FIG. 4 will be described below, and description of redundant steps will be omitted.

In step S407, the processing unit 50 calculates the absorbance of the peak caused by the contained substance from the absorption band of the contained substance. For example, peak wavelength information is stored in the storage 30 in advance along with baseline information of the optical spectrum for each type of sample S. The peak wavelength information includes peak absorbance information. For example, when the contained substance is ethylene glycol, for an angle of incidence of 71°, the peak wavelength is 2300 nm, and the absorbance is 0.7. Before the start of measurement, for example, when the operator performs an input for designating the type of the sample S via the input/output unit 40, similarly to when the absorbance of the water is calculated in step S406, the processing unit 50 reads the baseline information corresponding to the designated contained substance and performs baseline correction processing on the optical spectrum near the peak wavelength (for example, a band of ±100 nm from the peak wavelength) to calculate the absorbance of the peak of the contained substance.

In a step S409, the processing unit 50 derives the abundance rates of water and the contained substance in the sample S from the refractive index of the sample S, the absorbance of the water, and the absorbance of the contained substance. For example, a combination of the refractive index of the sample S, the absorbance of the water, and the absorbance of the contained substance, which are associated with each other based on experimental results and the like, and an abundance ratio of the moisture and the contained substance in the sample S are stored in the storage 30 in advance. The processing unit 50 reads the abundance ratio of water and the contained substance corresponding to the combination of the refractive index of the sample S, the absorbance of the water, and the absorbance of the substance.

In a step S410, the processing unit 50 outputs the abundance ratio of the water and the contained substance in the sample S. For example, the processing unit 50 displays the abundance ratio of the water and the contained substance on a display of the input/output unit 40 to output it to the user.

According to this variation, by measuring the baseline information and peak information in the optical spectrum of a known contained substance in advance and storing this in the storage 30, it is possible to measure the abundance ratio of the water and the contained substance in the sample S at high precision and high efficiency. Note, the number of contained substances for which the abundance ratio is found may be one or more. According to this variation, by knowing each contained substance and measuring the respective baseline information and peak information in advance, it is possible to measure the abundance ratio of the contained substances at high accuracy and high efficiency.

<Variation 2>

Figure 6:
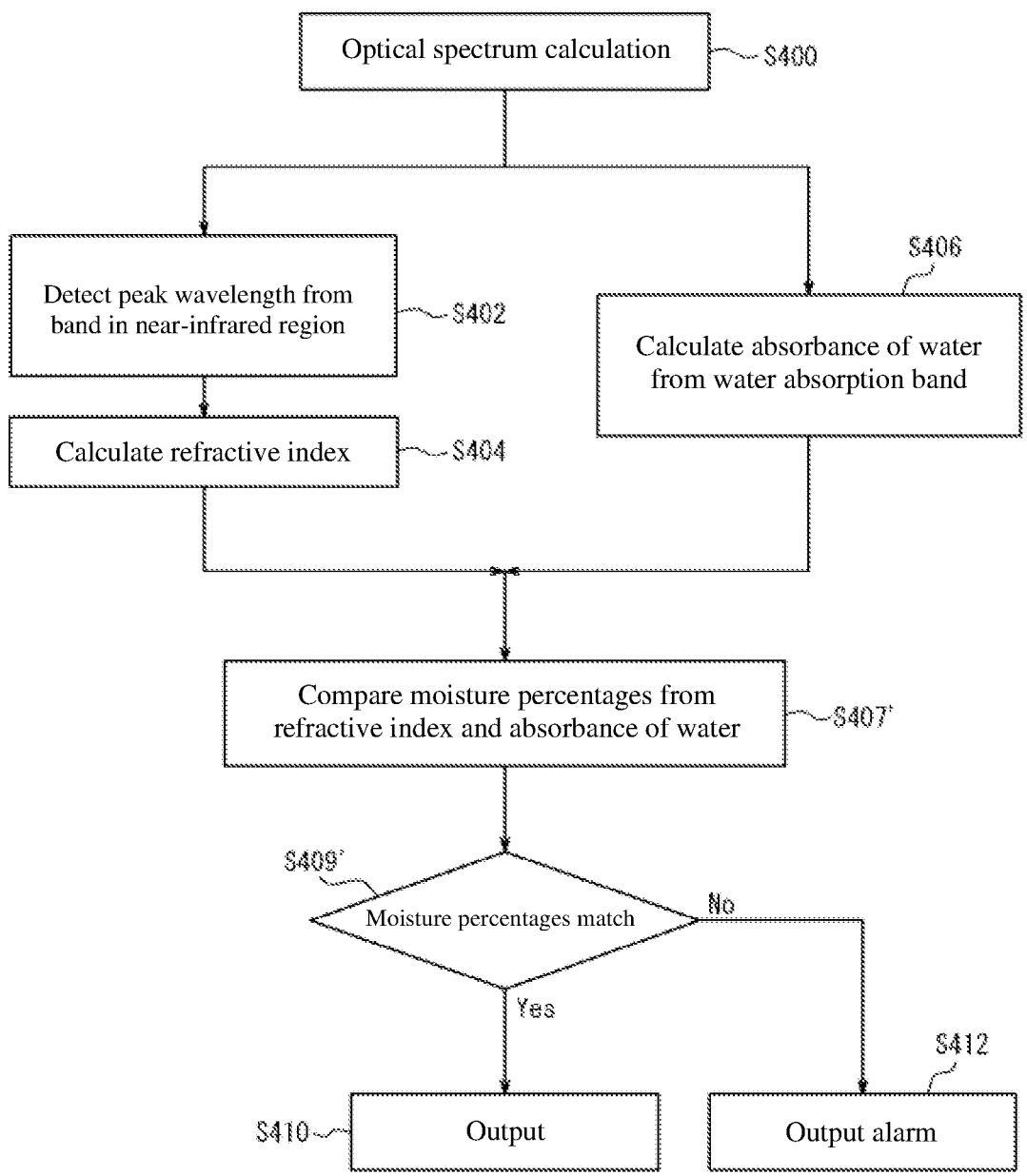
FIG. 6 is a flowchart for describing one example of operation of a spectroscopic analysis device.

FIG. 6 is a flowchart for describing a procedure of processing operation by the processing unit 50 in another variation. This modification relates to, for example, when the state of the sample S indicates an unexpected fluctuation in in-line measurement of the sample S transported in an industrial process, an operation procedure of the spectroscopic analysis device 1 for detecting such a fluctuation. When the refractive index of the sample S fluctuates even though the absorbance of the peak of water does not change, there is a possibility that a temperature change or contamination with molecules other than water has occurred. Therefore, the processing unit 50 of the spectroscopic analysis device 1 outputs a warning when it determines whether there is an unexpected fluctuation by comparing the absorbance of the peak of water with the refractive index of the sample S. FIG. 6 differs from the procedure in FIG. 4 in that step S408 in the procedure of FIG. 4 is replaced by a step S407' and a step S409' and a step S412 are added, but all other steps are the same as those in FIG. 4. Steps differing from those in FIG. 4 will be described below, and description of redundant steps will be omitted.

Once the processing unit 50 derives the refractive index of the sample S in step S404 and calculates the absorbance of water in step S406, in step S407', it compares the moisture percentage calculated from the refractive index to the moisture percentage calculated from the absorbance of water. For example, a moisture percentage corresponding to the refractive index and a moisture percentage corresponding to the absorbance of the water, which are found in advance by experiments or the like, are stored in the storage 30 for each type of sample S. The processing unit 50 reads the moisture percentage corresponding to the refractive index and the moisture percentage corresponding to the absorbance of the water from the storage 30 and compares the two.

In step S409', when the moisture percentage calculated from the refractive index and the moisture percentage calculated from the absorbance of the water match within an arbitrary margin of error (for example, ±5%) ("Yes"), the processing of the processing unit 50 proceeds to step S410, and the processing unit 50 outputs the matching moisture percentage. Meanwhile, when the moisture percentage calculated from the refractive index and the moisture percentage calculated from the absorbance of the water do not match ("No" in step S409'), the processing proceeds to step S412.

In step S412, the processing unit 50 outputs a warning. For example, the processing unit 50 displays information indicating that the state of the sample S is unexpectedly fluctuating on the display of the input/output unit 40 to output it to the operator.

According to this variation, in in-line measurement or the like, the operator can detect an unexpected fluctuation in the state of the sample S at an early stage.

Figure 7A:
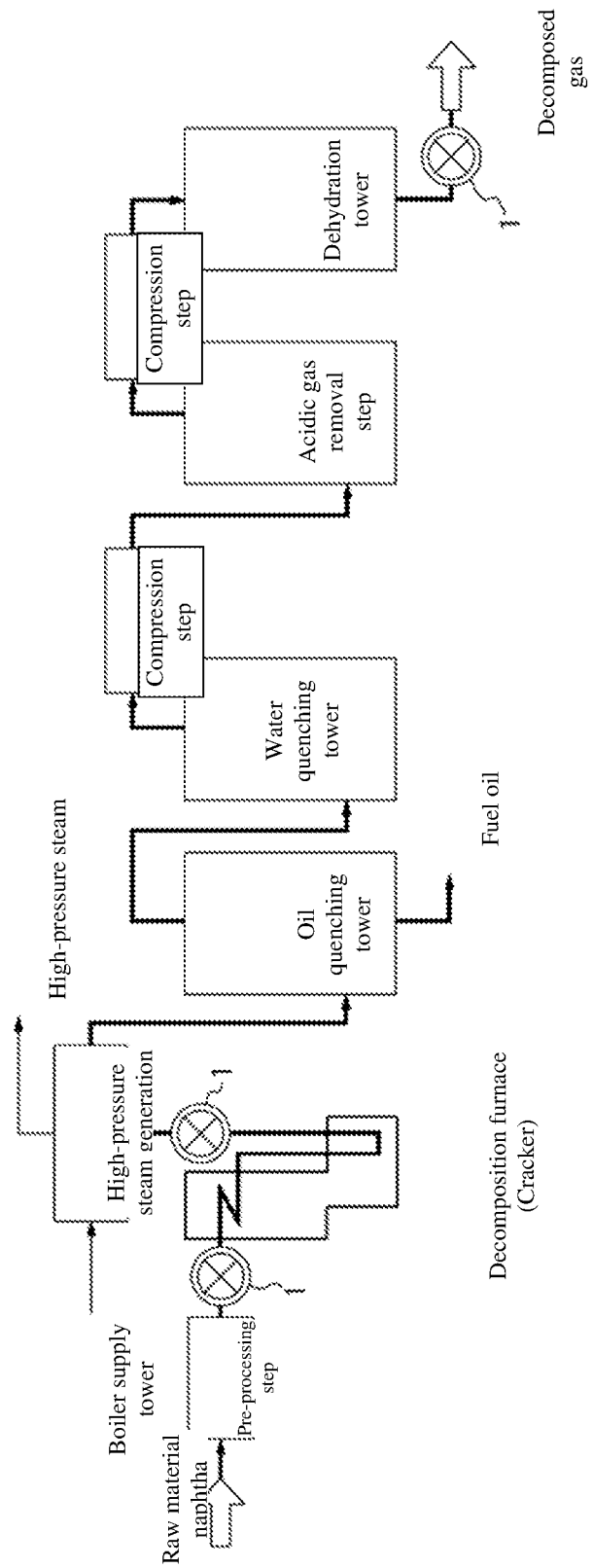
FIG. 7A is a chart for describing an example of an aspect of use of the spectroscopic analysis device.
Figure 7B:
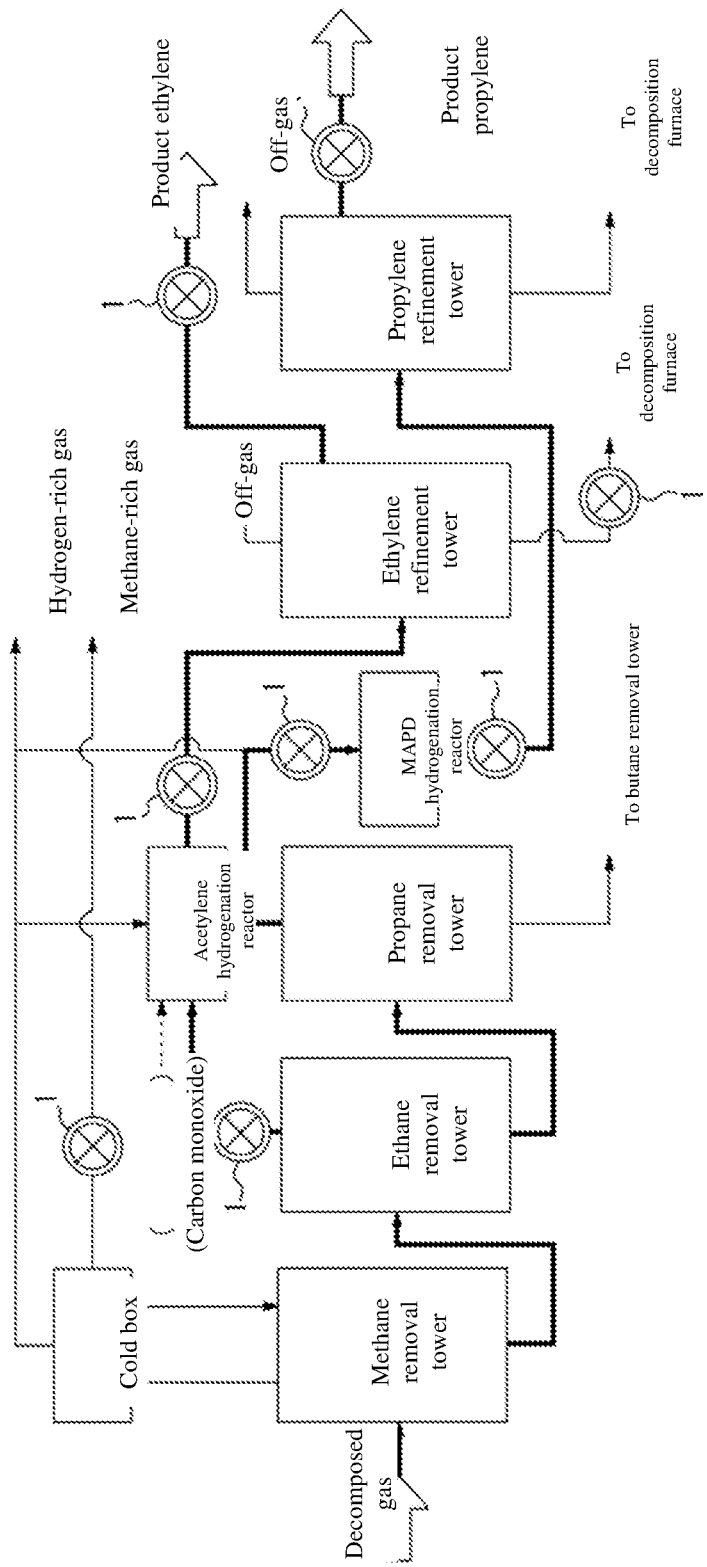
FIG. 7B is a chart for describing an example of an aspect of use of the spectroscopic analysis device.
Figure 7C:
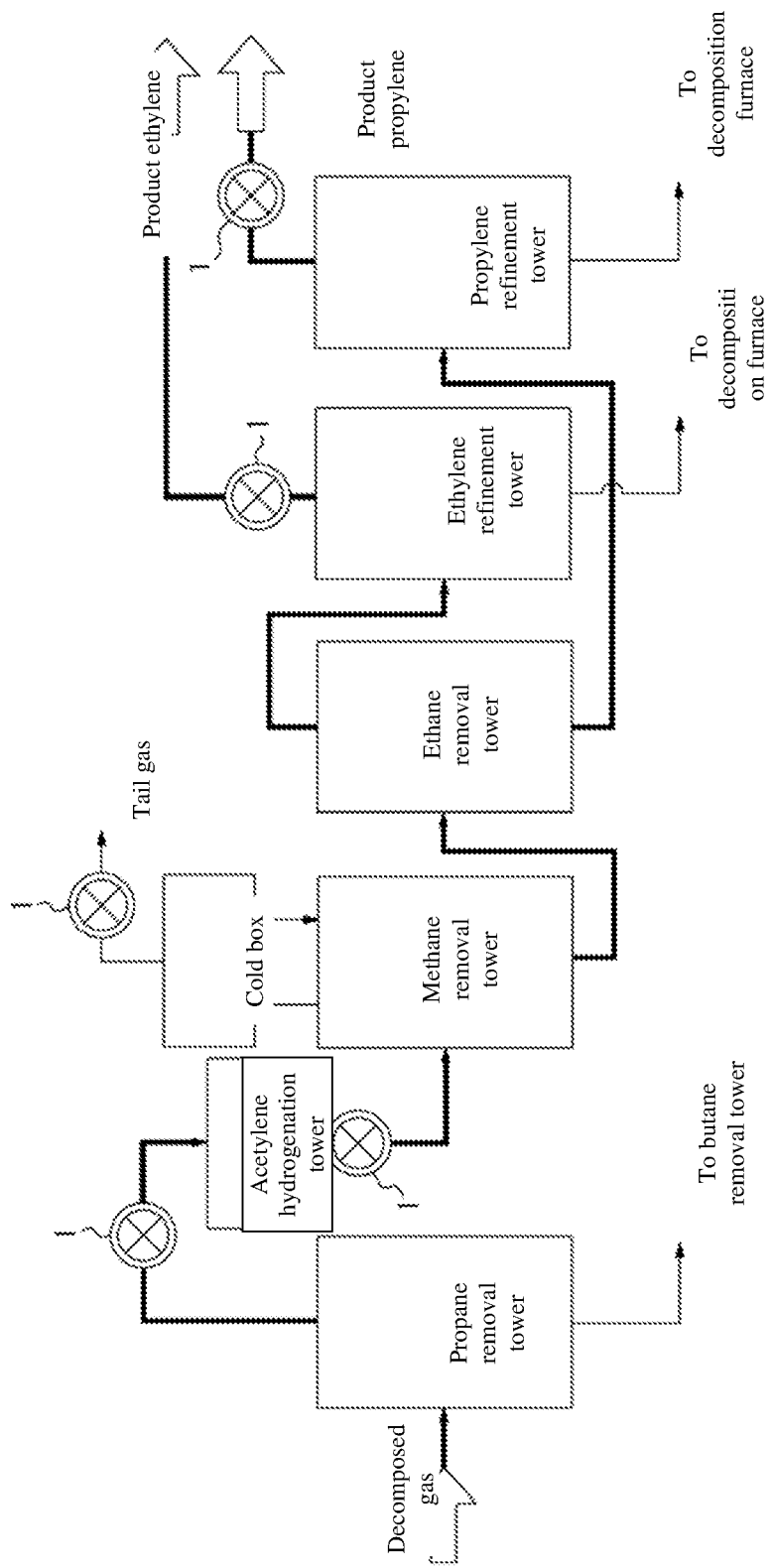
FIG. 7C is a chart for describing an example of an aspect of use of the spectroscopic analysis device.

FIGS. 7A to 7C illustrate aspects in which the spectroscopic analysis device 1 in the present embodiment is utilized. FIGS. 7A to 7C illustrate block flows of the ethylene production process using naphtha as a raw material, which is the final product in petroleum refining. As illustrated in FIG. 7A, carbon-carbon bonds of naphtha are cleaved (cracked) by a thermal decomposition furnace (cracker), and as illustrated in FIGS. 7B and 7C, the decomposed gas leaving the cracker is refined, reformed, fractionated, and purified into singular components over multiple stages. The spectroscopic analysis device 1 is provided before and after a decomposition furnace and after a dehydration tower, as illustrated in FIG. 7A, provided after a cold box, before and after an acetylene hydrogenation reactor, before and after an MAPD hydrogenation reactor, after an ethylene refinement tower, and after a propylene refinement tower, as illustrated in FIG. 7B, and further provided before and after an acetylene hydrogenation tower, after a cold box, after an ethylene refinement tower, and after a propylene refinement tower, as illustrated in FIG. 7C, and it measures the state of the decomposed gas or the like flowing through each location.

As illustrated in FIGS. 7A to 7C, the spectroscopic analysis device 1 of the present embodiment can be used for in-line measurement of various industrial processes and enables measurement of the state of the sample at high precision and high efficiency.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

For example, the arrangement, number, and the like of each component described above are not limited to the foregoing description and the contents illustrated in the drawings. The arrangement, number, and the like of each component may be arbitrarily configured insofar as the components can realize the functions thereof.

Furthermore, the above description was focused on a device, but one or more embodiments can also be realized as a method including steps executed by each component of the device, a method executed by a processor included in a device, a program, or a storage medium on which a program is recorded, and it should be understood that these are also encompassed in the scope of the present invention.

1 Spectroscopic analysis device
10 Irradiation unit
11 Broadband light source
12 Light guiding component
13 Light parallelizing component
14, 22, 24 Rotation mechanism
20 Detector
21 Polarizer
23 Condensing component
25 Light guiding component
26 Spectroscopic unit
30 Storage
40 Input/output unit
50 Processing unit
L1 Irradiation light
L2 Measurement light
M Metal film
P Prism substrate
S Sample

What is claimed is:

1. A spectroscopic analysis device, comprising:
a detector that detects measurement light obtained by irradiating, with irradiation light, a sample that contains a contained substance disposed on a film on which surface plasmons are generated, wherein the measurement light comprises information on an optical spectrum of the sample that comprises a resonance spectrum of the surface plasmons and an absorption spectrum of the sample; and
a processor that calculates from the detected optical spectrum:
a wavelength of a peak in a wavelength band that is enhanced by surface plasmons resonance and in which the resonance spectrum and the absorption spectrum are generated, wherein the wavelength is derived from a refractive index of the sample,
an absorbance of a peak, caused by water contained in the sample, based on an absorption wavelength band of the water, wherein the absorption wavelength band of the water is in a different wavelength region from the wavelength band that is enhanced by surface plasmons resonance,
an absorbance of a peak caused by the contained substance based on an absorption wavelength band of the contained substance,
a first percentage of the water based on the wavelength of the peak in the wavelength band enhanced by surface plasmons resonance,
a second percentage of the water based on the absorbance of the peak caused by the water,
a percentage of the contained substance to the sample based on the wavelength of the peak and the absorbance of the peak caused by the contained substance, and
output the percentage of the contained substance after determining that the first percentage and the second percentage of the water match within a predetermined margin of error.

2. The spectroscopic analysis device according to claim 1, wherein
the processor corrects the optical spectrum using a baseline of an optical spectrum in a state where a sample does not contain the contained substance, and
the processor calculates the absorbance based on the corrected optical spectrum.

3. The spectroscopic analysis device according to claim 2, wherein the detector detects the measurement light using the sample in-line in an industrial process.

4. The spectroscopic analysis device according to claim 1, wherein the detector detects the measurement light using the sample in-line in an industrial process.

5. An operation method using a spectroscopic analysis device, the method comprising:
detecting measurement light obtained by irradiating, with irradiation light, a sample that contains a contained substance disposed on a film on which surface plasmons are generated, wherein the measurement light comprises information on an optical spectrum of the sample that comprises a resonance spectrum of the surface plasmons and an absorption spectrum of the sample;

calculating, from the detected optical spectrum:
- a wavelength of a peak in a wavelength band that is enhanced by surface plasmons resonance and in which the resonance spectrum and the absorption spectrum are generated, wherein the wavelength is derived from a refractive index of the sample,
- an absorbance of a peak, caused by water contained in the sample, based on an absorption wavelength band of the water, wherein the absorption wavelength band of the water is in a different wavelength region from the wavelength band that is enhanced by surface plasmons resonance,
- an absorbance of a peak caused by the contained substance based on an absorption band an absorption wavelength band of the contained substance,
- a first percentage of the water based on the wavelength of the peak in the wavelength band enhanced by surface plasmons resonance,
- a second percentage of the water based on the absorbance of the peak caused by the water, and
- a percentage of the contained substance to the sample based on the wavelength of the peak and the absorbance of the peak caused by the contained substance; and outputting the percentage of the contained substance after determining that the first percentage and the second percentage of the water match within a predetermined margin of error.

6. A non-transitory computer-readable medium (CRM) storing instructions storing program instructions that cause a computer to perform operations, the operations comprising:
- detecting measurement light obtained by irradiating, with irradiation light, a sample that contains a contained substance disposed on a film on which surface plasmons are generated, wherein the measurement light comprises information on an optical spectrum of the sample that comprises a resonance spectrum of the surface plasmons and an absorption spectrum of the sample; and calculating, from the detected optical spectrum:
- a wavelength of a peak in a wavelength band that is enhanced by surface plasmons resonance and in which the resonance spectrum and the absorption spectrum are generated, wherein the wavelength is derived from a refractive index of the sample,
- an absorbance of a peak, caused by water contained in the sample, based on an absorption wavelength band of the water, wherein the absorption wavelength band of the water is in a different wavelength region from the wavelength band that is enhanced by surface plasmons resonance,
- an absorbance of a peak caused by the contained substance based on an absorption wavelength band of the contained substance,
- a first percentage of the water based on the wavelength of the peak in the wavelength band enhanced by surface plasmons resonance,
- a second percentage of the water based on the absorbance of the peak caused by the water, and
- a percentage of the contained substance to the sample based on the wavelength of the peak and the absorbance of the peak caused by the contained substance; and outputting the percentage of the contained substance after determining that the first percentage and the second percentage of water match within a predetermined margin of error.

\* \* \* \* \*